(12) United States Patent
Willett et al.

(10) Patent No.: US 11,860,743 B1
(45) Date of Patent: Jan. 2, 2024

(54) DATABASE OPERATIONAL COMPATIBILITY SAFEGUARDS

(71) Applicant: Amazon Technologies, Inc., Seattle, WA (US)

(72) Inventors: Dallas Lamont Willett, Albuquerque, NM (US); Prashant Bondada, Bothell, WA (US); Michael G. Rascher, Vancouver (CA); Slawomir Sobon, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 16/201,759

(22) Filed: Nov. 27, 2018

(51) Int. Cl.
| | |
|---|---|
| *G06F 7/00* | (2006.01) |
| *G06F 11/14* | (2006.01) |
| *G06F 9/455* | (2018.01) |
| *G06F 16/11* | (2019.01) |

(52) U.S. Cl.
CPC ...... *G06F 11/1469* (2013.01); *G06F 9/45558* (2013.01); *G06F 16/128* (2019.01)

(58) Field of Classification Search
CPC ...... G06F 16/128; G06F 16/256; G06F 16/84; G06F 16/951; G06F 11/1469; G06F 9/45558
USPC .......................... 707/639, 683, 999.204, 686
See application file for complete search history.

(56) References Cited

U.S. PATENT DOCUMENTS

| | | | |
|---|---|---|---|
| 8,990,264 B2 * | 3/2015 | Clayton | .............. H04L 67/1097 707/802 |
| 9,734,021 B1 | 8/2017 | Sanocki et al. | |
| 2004/0267835 A1 | 12/2004 | Zwilling et al. | |
| 2009/0222812 A1 * | 9/2009 | Nissen | .................... G06F 16/10 707/999.1 |
| 2011/0093435 A1 * | 4/2011 | Zha | ....................... G06F 16/128 707/639 |
| 2014/0108352 A1 | 4/2014 | Ahrens et al. | |
| 2014/0351214 A1 | 11/2014 | Abercrombie et al. | |
| 2016/0321339 A1 | 11/2016 | Tekade et al. | |
| 2017/0060699 A1 | 3/2017 | Hohl et al. | |
| 2019/0095455 A1 * | 3/2019 | Barreto | ............... G06F 11/1446 |

FOREIGN PATENT DOCUMENTS

WO      2014013437 A2      1/2014

* cited by examiner

*Primary Examiner* — Md I Uddin
(74) *Attorney, Agent, or Firm* — Davis Wright Tremaine LLP

(57) ABSTRACT

A distributed system responds to a request to enable restoration capability for a database instance by beginning a process for monitoring configuration changes made to a first operating environment of a first database instance. The system identifies a configuration change on which the database instance is dependent, and stores a record of the configuration change. The record is provided to a second operating environment. The second operating environment is configured, based on the record of the configuration change, to have configuration settings corresponding to the first operating environment as of the restoration point in time. The database instance is restored to the second operating environment.

20 Claims, 7 Drawing Sheets

DATABASE OPERATIONAL COMPATIBILITY SAFEGUARDS

BACKGROUND

A database management system may rely on failover to improve the availability and reliability characteristics of the system. Failover refers to the automatic or manual switching from a primary database instance to a standby database instance. For example, if a primary database instance fails, a database management system may react to the failure by having a standby instance take over the functions previously performed by the primary database instance.

In such systems, the standby database instance operates as a mirror, or replica, of the primary database instance. In order to maintain a complete copy of the data maintained by the primary database instance, the standby database instance processes the same transactions processed by the primary database instance. Typically, the primary database instance transmits a record of each transaction it has performed, or is about to perform, to the standby instance. The standby instance may then process the transaction, thereby keeping its copy of the data up-to-date.

BRIEF DESCRIPTION OF THE DRAWINGS

Various techniques will be described with reference to the drawings, in which.

DETAILED DESCRIPTION

Figure 1:
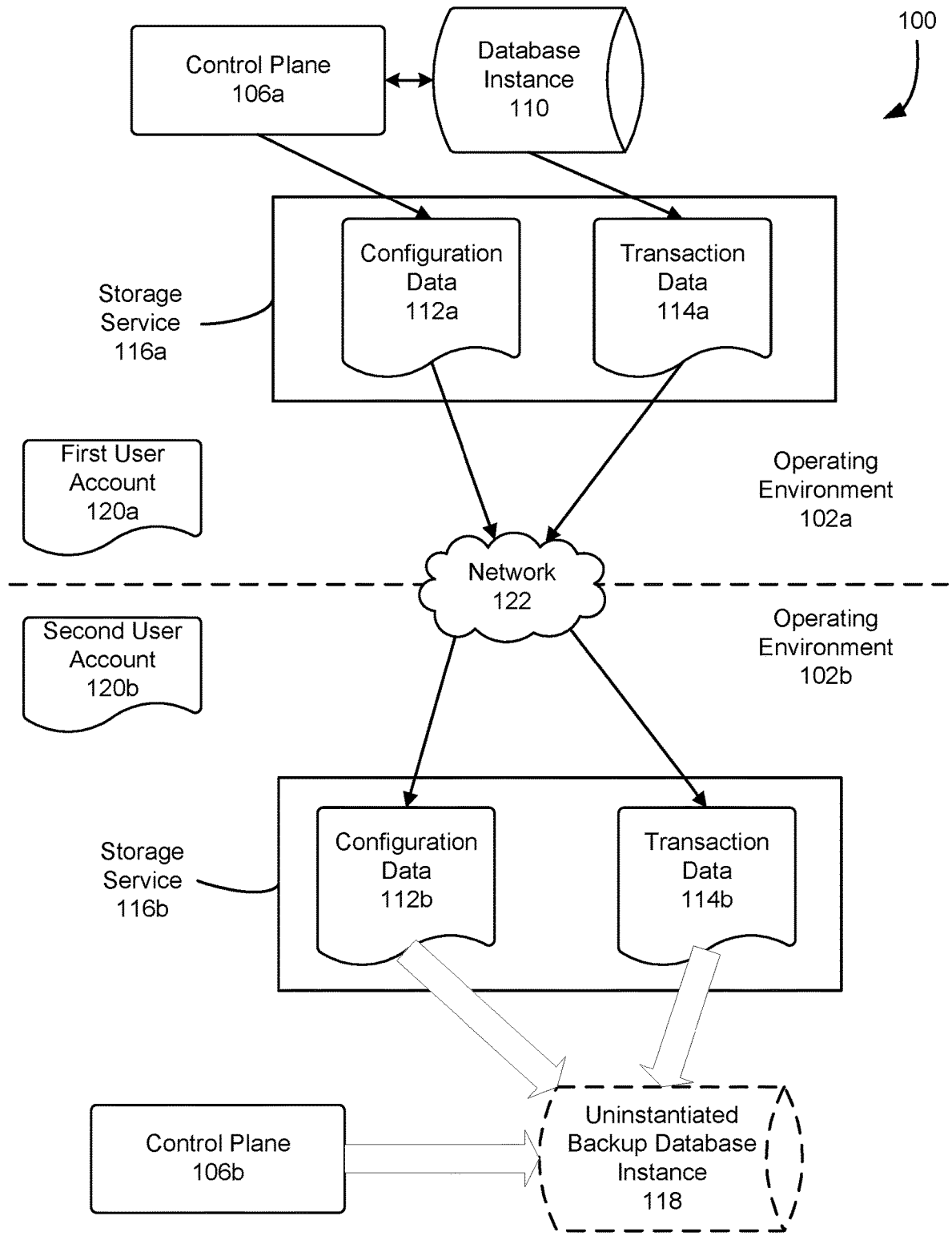
FIG. 1 illustrates a distributed system supporting point-in-time restore with operational compatibility safeguards, in accordance with an embodiment.

Described herein are systems and methods for maintaining operational compatibility when a database instance is restored. Operational compatibility refers to the ability to continue the operation of a database, and its client applications, even when the database and the environment in which it operates have undergone configuration changes. For example, an application that depends on a particular database setting being enabled may not function properly if, after being restored, the database no longer has that particular setting enabled.

Database management systems may use failover techniques to improve reliability and availability. Typically, such systems have a standby database node configured as a mirror or replica of a primary database node. The primary database node may, for example, transmit a record of each transaction it has performed, or is about to perform, to the standby node. The standby node may then process the transaction in the same manner as the primary node. In the event that the primary node fails, or is taken offline for maintenance, the secondary node thereby has an up-to-date copy of the data and can take over the role of the primary node. However, there are drawbacks to this approach: operating the standby node consumes power and computing capacity, and there may be licensing costs associated with the operation of the standby node. These technical and monetary costs may be incurred even though the standby node may be used only infrequently. Another issue is that the operating environment in which the standby database executes may not be fully compatible with the operating environment of the primary database, jeopardizing operational compatibility.

A distributed system may provide a point-in-time restoration capability without instantiating a standby node. Technical and monetary costs associated with the standby node are therefore avoided. The example distributed system may, for example, begin metering capacity utilized by a restored instance when such an instance is restored. Prior to that point, the technical and monetary costs associated with providing the restoration capability may be less than would be incurred by operating a standby database. The operational compatibility safeguards described herein may further enhance the capability to restore the database and continue operations.

Provision of the restoration capability may comprise replication between operating environments. The replication involves data that represents the transactions processed by the primary database instance, as well as configuration data. The transaction data can include snapshots, baselines, or image files of a collection of data maintained by the primary database instance, as well as data pertaining to individual transactions. For example, for a given object, a complete set of transaction data might include a snapshot of the object and a record of any changes, additions, or deletions to the object that occurred subsequent to the snapshot. A transaction may refer to an operation on the data, such as an insert, update, or delete operation. A transaction may also refer, in some cases, to sets or collections of such operations. The replicated configuration data can include aspects of the configuration of the operating environment on which the primary database instance is dependent. These aspects include, but are not limited to, configuration settings for the database itself, such as schema of the database, user-defined functions, credentials, and so forth. The replicated configuration data may also include configuration settings that are relevant to clients of the primary database instance. For example, client applications may rely on the database being localized to a particular jurisdiction, or dependent on the database conforming to a particular version of a schema. The replicated configuration data can also include aspects of the operating environment such as network settings, user accounts, virtual machine configurations, and so on.

Replicating the transaction data and configuration data between operating environments facilitates the provision of a point-in-time restoration capability. An operating environment refers to a combination of components and devices, connected by a network, which collectively perform a computing function. Operating environments may be isolated from each other in a manner that reduces the risk that a failure in one operating environment would be repeated in another. For example, a power failure in one operating environment is not likely to affect another operating environment in a distant geographic location. This example should not, however, be viewed as limiting the scope of the present disclosure to only those embodiments in which operating environments are located at different geographic locations.

Replication of the transaction and configuration data may be accomplished via the use of a distributed storage service, which may also be referred to herein as a storage service. A distributed storage service comprises computing devices and components that, collectively, provide scalable storage infrastructure. A distributed storage service may further provide replication features suitable to replicate transaction and configuration data between locations accessible to a source operating environment, in which a primary database instance executes, and a target operating environment, in which the primary database instance may, upon request, be restored.

In an example, operational compatibility safeguards comprise systems and procedures for linking configuration information associated with accounts and operating environments associated with those accounts. For example, a distributed system may receive a request to enable a point-in-time restoration capability for a database instance. In response, the distributed system may monitor, by a control plane, a configuration change to the operating environment in which the database instance executes, which may be referred to as the source operating environment. The distributed system may store a record of the monitored change, and replicate the record to a target operating environment. The configuration change may, based on the record, apply the configuration change to the second operating environment. The distributed system may apply further configuration changes so that the target operating environment is made to have configuration settings that correspond to that of the source operating environment. The database instance can then be restored to the target operating environment. By applying configuration changes up to a designated point in time, the database instance and its operating environment can be restored to its state as of the designated point in time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. In some embodiments, the computing capacity consumed to provide a point-in-time restore capability is reduced. In some embodiments, the technical and monetary costs of maintaining an operational standby database are reduced or eliminated. In some embodiments, greater flexibility regarding the location of a restored database is provided. Moreover, as described herein, some or all of these advantages may be achieved in combination with improved capability for maintaining operational compatibility in the event that a backup database instance is instantiated.

FIG. 1 illustrates a distributed system 100 supporting point-in-time restoration with operational compatibility safeguards, in accordance with an embodiment. In the example distributed system 100, a database instance 110 is operative in a first operating environment 102a, and can be restored by the distributed system 100 in a second operating environment 102b. The first operating environment 102a is associated with a first user account 120a, and the second operating environment 102b is associated with a second user account 120b.

A user account may refer to a security principal used to authenticate access a computing function of the distributed system 100. A user account may be associated with a set of credentials, such as a user name and password combination. A user account, which may also be referred to as an account, may be associated with the operation of a database instance. Examples of such association include, but are not necessarily limited to, ownership of a collection of data maintained by the database instance, association with a security principal under which one or more threads of the database instance execute, association with administrative rights for the database, and so on. User accounts may also be associated with operating environments. Examples of such association include administrative and access rights.

In an embodiment, a user account may be used to perform a variety of operations related to the configuration and functioning of an operating environment, such as the depicted operating environment 102a in which the database instance 110 operates. The operations that may be performed on behalf of the first user account 120a include creating the database instance 110, accessing the database instance 110, configuring network and security settings of the operating environment 102a, and so forth. These operations may be performed by and logged by the control plane 106b. Storage for records describing configuration changes can be stored as configuration data 112a on the storage service 116a, or on a locally or remote managed storage device.

Records of configuration changes made to the operating environment 102a may be considered to be associated with and/or owned by the corresponding user account 120a, and any linked user accounts, such as the depicted second user account 120b. Configuration continuity involves the maintenance and replication of this data, such that the configuration data is available to use when restoring a database instance or the operating environment in which the database instance is to execute.

In the example of FIG. 1, a second user account 120b is associated with the operating environment 102b in which the creation of a backup database instance may be requested. In this example, the operating environment is instantiated prior to the backup database instance 118. The second user account 120b can be used, prior to creating the backup database instance 118, to perform various operations in the second operating environment 102b.

In cases and embodiments, configuration changes made to the first operating environment 102a can be applied to the second operating environment 102b within a threshold period of time. In other cases and embodiments, the records of the changes, as stored in the configuration data 112b, can be applied to the second operating environment 102b at a later time, such as on-demand or when the backup database instance 118 is instantiated.

In some embodiments, however, the second operating environment 102b is not created until needed for instantiating the backup database instance 118. In these circumstances, the second user account 120b is still created, but is not yet explicitly linked to the second operating environment 102b. The configuration changes can be applied to the second operating environment 102b when the operating environment 102b is instantiated, or at a later time, such when the backup database instance 118 is instantiated.

An operating environment refers to a combination of components and devices, connected via a network, which collectively perform a computing function. An operating environment may be said to be instantiated when a combination of such components and devices has been configured to perform the function. Note that in various cases and embodiments, a given combination of components and devices may be configured to host a number of operating environments.

Figure 7:
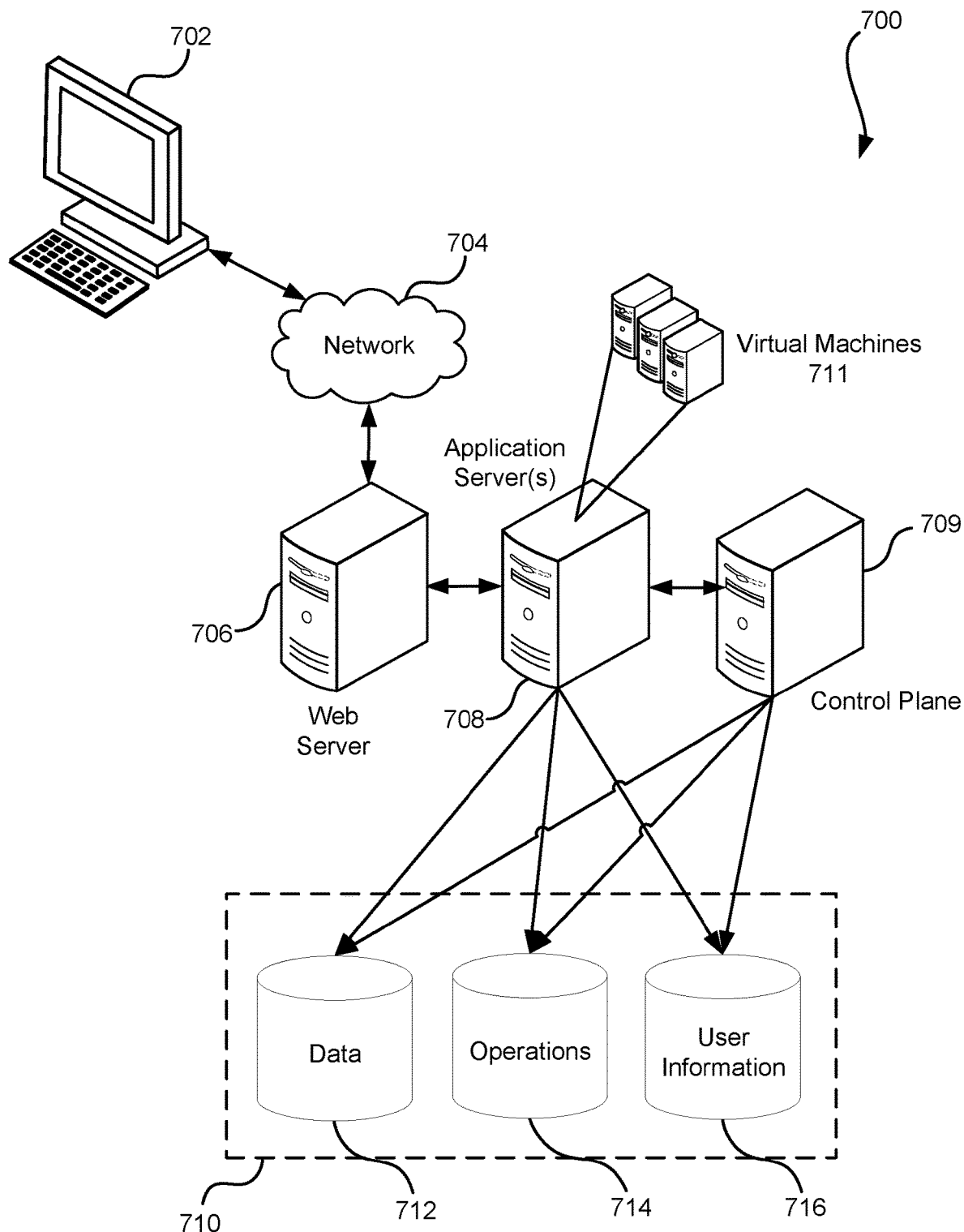
FIG. 7 illustrates a system in which various embodiments can be implemented.

As depicted in FIG. 1, operating environments 102*a*, 102*b* may be isolated from each other. For example, the components and devices in operating environment 102*a* may be in geographic proximity with each other, for example at the same data center. The components and devices in operating environment 102*b* may be in geographic proximity with each other, e.g., at the same data center, but geographically remote from the other operating environment 102*a*. The components within an operating environment 102*a* may be connected by a communications network that is relatively high-speed compared to the network 122 that connects the two depicted operating environments 102*a*, 102*b*. Further aspects of an operating environment are depicted in FIG. 7.

The operating environments 102*a,b* may, in some cases and embodiments, correspond to operating regions of the distributed system 100. For example, the components and devices of a first operating environment 102*a* may be located in a first geographic region, and the components and devices of a second operating environment 102*b* may be located in a second geographic region. The operating environments may be connected by a network 122, which may include any of various communications networks, including but not limited to the Internet, wide-area networks, mesh networks, fiber optic networks, wireless networks, satellite-based networks, powerline networks, and so on, individually and in various combinations.

In the example distributed system 100, control planes 106*a,b* perform operations to coordinate the activities and operation of components within their respective operating environments 102*a,b*. In an embodiment, each of the control planes 106*a,b* comprises a module installed on an application server, such as the control plane and application server depicted by FIG. 6. A module, as used herein, refers to processor-executable instructions stored in a non-transitory memory of a computing device. The instructions, when executed by at least one processor of the computing device, cause the computing device to perform at least the described operations of the module.

Examples of operations performed by a control plane 106*a,b* include configuring networks within an operating environment 102*a,b*, allocating and configuring hardware devices, including computing devices, allocating and configuring virtual machines, installing software on the virtual machines, and so forth. Further operations of the control plane 106*a,b* can include, in various embodiments, enforcing compliance with access policies related to ensuring operational continuity in the event that a user account is compromised. For example, the control planes 106*a,b* can ensure that configuration changes related to operational continuity, including restoration capabilities, are not terminated without mutual authorization from the primary and secondary accounts.

A control plane 106*a* in the first operating environment 102*a* controls and monitors execution of a database instance 110. The database instance 110 is in the same operating environment 102*a* as the control plane 106*a*. The controlling and monitoring may comprise monitoring and record information about the configuration of the database instance 110. This can include information about the storage devices used by the database, database account information, and so on. It can also include preventing configuration changes to the database, where those changes might interfere with the replication of transaction data, or otherwise interfere with the ability to do a restoration of the database instance. These types of changes can be prevented by the control plane 106*a*, except when the control plane is able to obtain authorization for the change from both of the first and second user accounts 120*a,b*.

The control plane 106*a* may also control and monitor the operating environment 102*a* for changes to aspects of the configuration of the operating environment. The control plane 106*a* may monitor and record information concerning aspect of the operating environment 102*a* on which the database instance 110 depends. This may include information on which replication depends. Examples of configuration information which might be monitored and recorded include, but is not limited to, routing tables, domain name service entries, virtual private network settings, encryption keys, and so on.

The control plane 106*a* may also log changes to the operating environment 102*a*, including changes to any processes, modules, or subsystems which may be hosted in the operating environment 102*a*, including the database instance 110. The control plane 106*a* may also, in some embodiments, send data indicative of configuration changes to other operating environments, such as the depicted operating environment 102*b*.

In the example illustrated by FIG. 1, the control plane 106*a* receives a request to enable a point-in-time restoration capability for the database instance 110. A point-in-time restoration capability refers to an ability to restore a database instance such that the data managed by the restored database instance is up-to-date as of an indicated time. For example, if the database instance 110 were to crash, a client might request that the database instance 110 be restored with data that was current as of the time of the crash. Having a point-in-time restoration capability does not necessarily require that all data from the initial database instance 110 be available. However, the distributed system 100 may ensure that a point-in-time restoration will likely be able to restore all relevant data within a threshold range of a requested time, so that the restored database instance can effectively act as a replica or replacement of the original database instance.

In the example distributed system 100, point-in-time capability is provided without a live backup instance. The backup database instance 118 may therefore remain uninstantiated until a point-in-time restoration is requested. This approach reduces the costs of providing the point-in-time restoration capability, in both technical and monetary aspects. For example, prior to a restoration, no processors need to be allocated for executing a backup database instance, or processing transactions. Database licensing costs may also be reduced, since in distributed system 100 the backup database is not instantiated unless a restoration is requested. Instantiation refers to the process of creating the database instance. An instantiated database instance is therefore a database instance that has been created or made operational.

The control plane 106*a* responds to the request to enable point-in-time restore capabilities by causing configuration data 112*a* and transaction data 114*a* to be written to a storage location. In the example of FIG. 1, the control plane 106*a* causes the configuration data 112*a* and transaction data 114*a* to be written to the storage service 116*a*.

The configuration data 112*a* comprises data pertaining to or describing the operating environment 102*a* and the database instance 110, particularly data relating to configuration of the operating environment 102*a*, include the configuration of the database instance 110. For example, the configuration data 112a can include details about the configuration of the operating environment 102a on which the database instance 110 depends. Examples of configuration data include, but are not limited to, virtual machine images, database snapshots, user credentials, account credentials, digital certificates, network settings, virtual private network ("VPN") settings, operating system patches, registry entries, and so on. Further examples include storage device settings, storage service properties, database schemas, and so on. In general, the configuration data 112a includes any information that is to be restored in the event that a backup database instance 118 were to be instantiated. This may include whatever settings might be desired or needed to ensure that the backup database instance 118 can operate effectively as a replacement for the primary database instance 110.

The transaction data 114a comprises records of transactions performed by the database instance 110. The transaction data 114a may include a transaction log. A transaction log is a record of the operations performed by a database. Typically, a transaction log is ordered by the time at which the operations were performed. A transaction log can be replayed to a database in order to repeat operations that were recorded in the transaction log but never committed to the data managed by a database instance, such as the depicted database instance 110. The transaction data 114a can also include a snapshot of the database.

The control plane 106a causes at least a subset of data from the transaction log of the database instance 110 to be written to the storage service 116a. This transaction data 114a can include records of transactions subsequent to a snapshot of the database instance 110. Although not explicitly illustrated in FIG. 1, the control plane 106a may also cause a snapshot of the database instance 110 to be written to the storage service. Here, the snapshot refers to a baseline version of the collection of data that is managed by the database instance 110. Together, the transaction data 114a and the snapshot can be used, as described herein, to reconstruct the data state of the database instance 110 at a requested point in time.

In some instances, the database instance 110 writes data to a storage device that is not replicated. In such instances, the control plane 106a reads the transaction data 114a from this storage device and sends it to the storage service 116a. This process of replication is ongoing once started in response to the request to enable a point-in-time restore capability.

In an embodiment, the storage service 116a is independent of the operation of the database instance 110, and possibly independent of the operating environment 102a. For example, the storage service 116a might, instead of being part of the operating environment 102a, be an Internet-based storage service that is accessible to the control plane 106a in the operating environment 102a.

In an embodiment, the storage service 116a comprises scalable infrastructure for data storage. For example, a storage service 116a can comprise a control plane that is similar though not necessarily identical to the control plane 106a, a plurality of application servers such as the application server depicted in FIG. 6, and a plurality of storage devices.

The storage service 116a is accessible to other components and devices within the operating environment 102a, and is also connected via the network 122 to a comparable storage service 116b in another operating environment 102b. The data stored by the storage service, e.g., the configuration data 112a and transaction data 114a, is therefore accessible to both the control plane 106a in the first operating environment 102a and the control plane 106b in the second operating environment 102b.

Data maintained in the storage service 116a of the first operating environment 102a is replicated to the storage service 116b in the second operating environment 102b. In some embodiments, the replication is performed by the storage services 116a,b, using replication modules operative as components of the storage services 116a,b within each respective operating environment 102. The replication modules, which may be operative on an application server such as those depicted in FIG. 6, communicate with each other via the network 122. The replication module in the first operating environment 102a reads data from storage devices of the storage service 116a and transmit the data to the replication module in the other operating environment 102b. There, the replication module in the second operating environment 102b stores the data on storage on devices of the storage service 116b in the second operating environment 102b.

Although not explicitly depicted in FIG. 1, some embodiments may utilize replication modules similar to those just described, but which operate independently of the respective storage services 116 in the operating environments 102a,b. In such embodiments, a replication module in the first operating environment 102a transmits data from the storage service 116a in the first operating environment to the replication module in the second operating environment 102b. The replication module in the second operating environment 102b then causes the received data to be stored by the storage service 116b in the second operating environment.

Although not explicitly depicted in FIG. 1, in some cases a plurality of storage devices may be used in place of the respective storage services 116 in each of the operating environments 102. In such cases, a control plane may coordinate utilization of the storage devices, and a replication module in the first operating environment 102a transmits data to a replication module in the other operating environment 102b.

The replicated data can comprise the configuration data 112b and transaction data 114b. A snapshot of the database can also be replicated to the second operating environment 102b. Regardless of whether the replication is done by the storage services 116a,b or done independently, these components may be replicated independently of the operation of the database instance 110. It may, however, be advisable to tune the speed of replication in accordance with target times for restoration. Lag in the replication process may delay instantiation and restoration of a backup database instance, or limit how up-to-date the point-in-time restoration may be.

A control plane 106b in the second operating environment may receive a request to restore the database instance 110. In general terms, the restoration process involves the various steps and/or operations needed to instantiate a backup database instance 118, and to restore the data maintained by the primary database instance 110. As described above, the backup database instance 118 is not instantiated until such a request is received. As such, it may be the case that the only technical costs associated with the provision of the point-in-time restore capability are those costs associated with storage and data replication. Here, costs refer primarily to the consumption of computing or other technical resources.

The control plane 106b may receive the request to restore the database instance 110 from a control plane 106a in the other operating environment 102a, or from a message triggered by a user interface or application programming interface ("API"). Although not explicitly depicted in FIG. 1, a user interface or API may be provided to allow for the submission of a request to enable point-in-time restore capabilities, and to allow for the submission of a request to initiate a restoration process. The user interface may communicate these instructions to control plane 106*a* or control plane 106*b*. Note that the capabilities and functioning of the user interface, particularly with respect to requesting that a database instance be restored, should be available to a client even in cases where the first operating environment 102*a* is unavailable. Thus, in at least some embodiments, the control plane 106*b* can receive a request to restore a database instance even when the first operating environment 102*a* is unavailable.

In response to the request to restore the database instance 110, the control plane 106*b* in the second operating environment performs operations to configure the operating environment 102*b* to support the backup database instance 118, installing and activating the backup database instance 118 on a virtual machine, configuring the backup database instance 118, obtaining database snapshots (if available), and replaying the transactions log data 114*b* to restore the data state of the primary database instance 110 to the backup database instance 118.

Note that although the term restore is used with respect to the process for instantiating the database instance 110, there may be cases where the database instance 110 remains available and/or operative after the backup database instance is instantiated. Thus, the term restoration does not necessarily imply that the primary database instance 110 has failed, been interrupted, or has ceased to exist. Instead, the term restore refers to creating a copy of the primary instance, with data that is current up to an indicated point in time, regardless of the current state of the primary database instance 110.

As used herein, a database instance refers to a module for performing the functions of a database and a collection of data on which the module performs those functions. In various embodiments, the collection of data is owned either by a single entity, or by a single tenant of a multi-tenant database system. A multi-tenant database system is one in which data owned by a number of entities is managed by a single database, or by a plurality of databases which are collectively managed and owned by a plurality of entities. In the case of a multi-tenant database, a database instance generally refers to the module and the collection of data owned by a particular tenant, or to a set of tenants for whom a point-in-time restore capability is being enabled.

Figure 2:
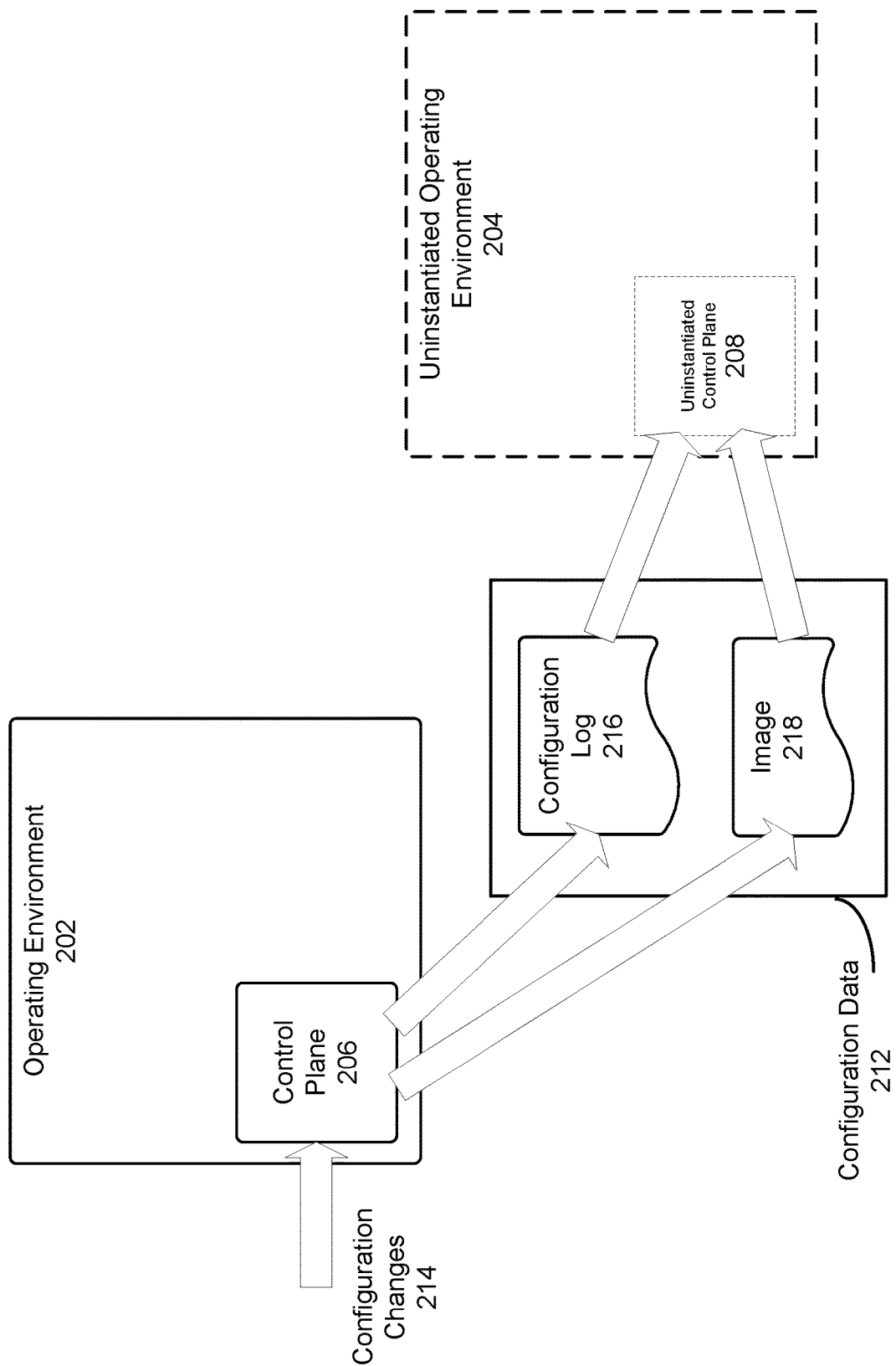
FIG. 2 illustrates aspects of configuration synchronization, in accordance with an embodiment.

FIG. 2 illustrates aspects of configuration synchronization, in accordance with an embodiment. In the example of FIG. 2, configuration changes 214 are routes through a control plane 206 and applied to an operating environment 202.

In embodiments, the control plane 206 generates s configuration log 216, image 218, and other forms of configuration data 212.

The configuration log 216 refers to records or other data indicative of changes made to the operating environment 202. For example, in an embodiment the configuration log 216 comprises a file containing ordered records, each of which describes a change changes made to the operating environment 202.

In embodiments, the control plane 206 records entries in the change log in response to requests to change the configuration of the operating environment 202. For example, the control plane 206 may receive a request to change the operating environment 202, record the entry, and complete the request by changing the operating environment 202 in accordance with the request. The log may further contain an indication of whether or not the change was successful. In some embodiments, changes which were not successful in operating environment 202 are not subsequently applied to other operating environments. This is to maintain consistency between the existing operating environments and any new operating environments, such as the depicted uninstantiated operating environment 204.

The image 218 refers to binary data that is representative of state information. For example, with respect to virtual machines, the image 218 can correspond to state data for the virtual machine. In various embodiments, image data for a virtual machine can be used to capture the state of the virtual machine, and to subsequently resume execution of the virtual machine. These functions may be performed by making use of the features of a hypervisor.

In embodiments, the image 218 comprises data representing a virtual machine state. For example, the control plane 206 may store an image of a virtual machine on which a database instance operates. For example, with respect to FIG. 1, the database instance 110 may operate on a virtual machine, such as those depicted in FIG. 7. The control plane 206 may cause the image to be generated in a various ways, such as using programmatic interfaces provided by a hypervisor of the virtual machine.

In embodiments, the control plane 206 causes the image 218 to be generated in response to a change to the configuration of the virtual machine, such as the installation of an application. For example, the control plane 206 may generate the virtual machine after database software is installed on the virtual machine, or after client applications are installed and configured.

In embodiments, the control plane 206 causes the image 218 to be generated on a periodic basis, in order to capture configuration changes that the control plane 206 might not be aware of, or is unable to accurately or efficiently record in a log of configuration changes. For example, certain changes might be made without involvement of the control plane 206. In embodiments, the control plane 206 causes the image 218 to be generated on upon request.

Images may be recorded in response to configuration changes that are not routed through the control plane 206, configuration changes that are unable to be accurately recorded in a log of configuration changes, or for configuration changes that are efficiently applied via imaging. An administrator of the operating environment 202 might request that the control plane generate the image after making such a change.

In the example of FIG. 2, a second control plane 208 is not yet instantiated during the operation of the first control plane 206. During this period, configuration changes are applied to the first control plane 206. At some later point, such as when a database instance is to be restored, the second control plane 208 may be instantiated. In embodiments, this process involves the initialization of a control plane 208 within the new operating environment 204. The control plane 208 then directs the further configuration of the new operating environment. The control plane 208 may, for example, cause the installation of operating systems, hypervisors, virtual machine images, executable programs, and so forth.

In embodiments, the configuration data 212 is replicated and made available to the control plane 208. After initializing the new operating environment 204 to a baseline state, the control plane 208 applies the configuration data 212 to the new operating environment 204. The application of the configuration data may, in embodiments, proceed in accordance with the following procedure. The control plane may first apply the most recently captured images for virtual machines. Configuration changes which occurred prior to the generation of these images may be discarded, in some cases, when those changes applied to the configuration of the virtual machine and are therefore already reflected in the image. Next, any snapshots, baselines, or other data may be stored on the virtual machines. Then, each configuration change may be applied in the order they are found in the log. Note that although these operations have been described as occurring in a particular order, this order should not be construed as limiting the scope of the present disclosure to only those embodiments that perform the operations in the provided order. Except where logically required, the provided operations may be altered, reordered, omitted, or performed in parallel.

Figure 3:
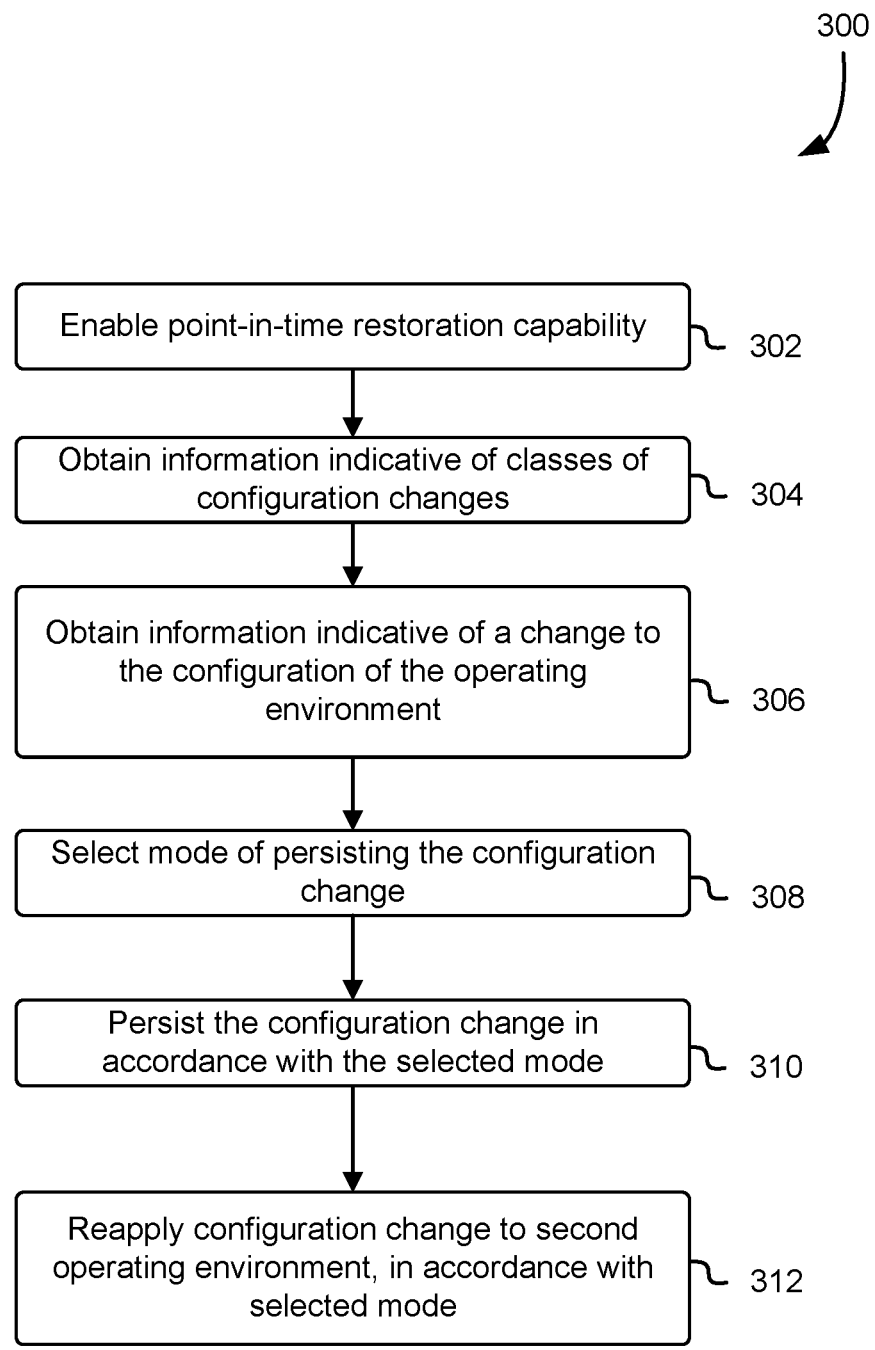
FIG. 3 is a flow diagram illustrating aspects of a distributed system performing configuration synchronization.

FIG. 3 is a flow diagram illustrating aspects of a distributed system performing configuration synchronization. Although FIG. 3 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 300 may be implemented by a distributed system. In an embodiment, a control plane performs one or more of the depicted operations. Examples of a control plane that may implement the depicted operations are provided at least in FIGS. 1 and 7.

At 302, the distributed system enables a point-in-time restoration capability. Aspects of enabling a point-in-time restoration are provided by FIG. 5.

At 304, the distributed system obtains information indicative of classes of configuration changes. This information can comprise data or code usable to classify a configuration change. For example, a configuration change can be classified as being related to the operation of the database instance, related to the operation of a client application, and so forth. An aspect of the classification can include whether or not a configuration change should be replicated to the target environment in the event that a database instance is to be restored to the target environment. Another aspect of the classification can include how the configuration should be persisted.

In some cases and embodiments, the distributed system obtains information indicating classes of configuration changes that may be applied to a target environment in different ways. The information may further comprise information indicating how and when a corresponding category of configuration change should be changed. In an embodiment, the distributed system can be provided with a metadata file that maps from configuration settings applicable to a source operating environment to configuration settings applicable to a target operating environment. For example, the metadata file might comprise information that indicates how physical memory and processing capacity might be allocated to virtual machines in the source and target operating environments. In this way, the system can adapt the configuration settings to the capabilities of virtual or physical devices, such as virtual machines or application servers, in the target environment. Given that each operating environment might have different amounts of memory or capacity available, these factors might need to be adjusted when restoring a database instance to the target operating environment. The metadata can describe permissible ranges for these adaptations. In some cases and environments, the distributed system can be provided with script or executable code which describes procedures for adapting configuration changes to the target operating environment.

In an embodiment, a control plane in an operating environment, such as the first operating environment 102a depicted in FIG. 1, obtains the information indicative of the classification. The control plane may, for example, have installed on it executable code and metadata comprising the information indicative of the classifications.

At 306, the distributed system obtains information indicative of a particular change to the configuration of the operating environment. This refers to a change to the operating environment that has been requested, or to a change that has been performed.

At 308, the distributed system selects a mode of persisting the configuration change. Persisting refers to storing information describing or representing the configuration change. Selecting the mode of persisting refers to determining a format or procedure for storing or representing the configuration change.

In an example, the control plane stores information indicative of the configuration change in a log of configuration changes. The log format may be suited for configuration changes that involve altering settings, adding registry entries, executing simple commands, and so forth. These examples should not, however, be construed as limiting.

In an example, the control plane stores information indicative of the configuration change in an image. The control plane may, for example, cause a hypervisor of a virtual machine to generate and store an image of the virtual machine. The image format may be suited to capture configuration changes that are relatively complex, such as the myriad configuration changes that may result from running an installation program. The image format may also be suited to capture the state of a virtual machine in a baseline state.

At 310, the distributed system persists the configuration change in accordance with the selected mode. In an embodiment, the control plane causes the configuration data, such as configuration logs and image data, to be written to a storage device or a storage service. In some instances, the data can then be replicated or otherwise made available to other operating environments.

Persisting the configuration change can comprise storing information indicative of the order in which the configuration change should be applied. For example, the distributed system might store information indicating that a virtual machine image should be applied prior to the changes represented in a configuration log. The entries in a configuration log might be stored in the order in which the changes should be performed, or might contain some other information indicative of the order in which the changes should be performed. In some instances, the distributed system may store information indicating the relative order of applying different units of configuration data, such as information specifying the relative order of applying configuration log files and image files.

In an embodiment, the order of application is determined based at least in part on the classification of the configuration change. As noted, the classification may be based on code or metadata. The order of application may, in some cases and embodiments, involve parallel application of the changes. Whether or not parallelism is used may be determined, in some embodiments, based on the classification, and on any dependencies.

At 312, the distributed system applies the configuration change to a second operating environment, in accordance with the selected mode. In cases and embodiments, the configuration changes are applied by a control plane in the target operating environment.

For configuration changes represented by entries in a configuration log, the control plane performs a configuration action corresponding to each entry. For example, if entry comprises a command to change a registry setting, the control plane causes that command to be executed on the computing device or virtual machine whose registry is to be affected. Various management interfaces may be used to execute the commands.

As noted above, the configuration changes may be adjusted in order to better suit the target operating environment. In an embodiment, the distributed system applies metadata to identify configuration changes to adapt to the target operating environment. As explained in more detail above, this may involve applying information that maps between aspects of the configuration of the source environment to aspects of configuration of the target environment, and functions, procedures, or transforms for adapting the configuration settings to the target environment.

Figure 4:
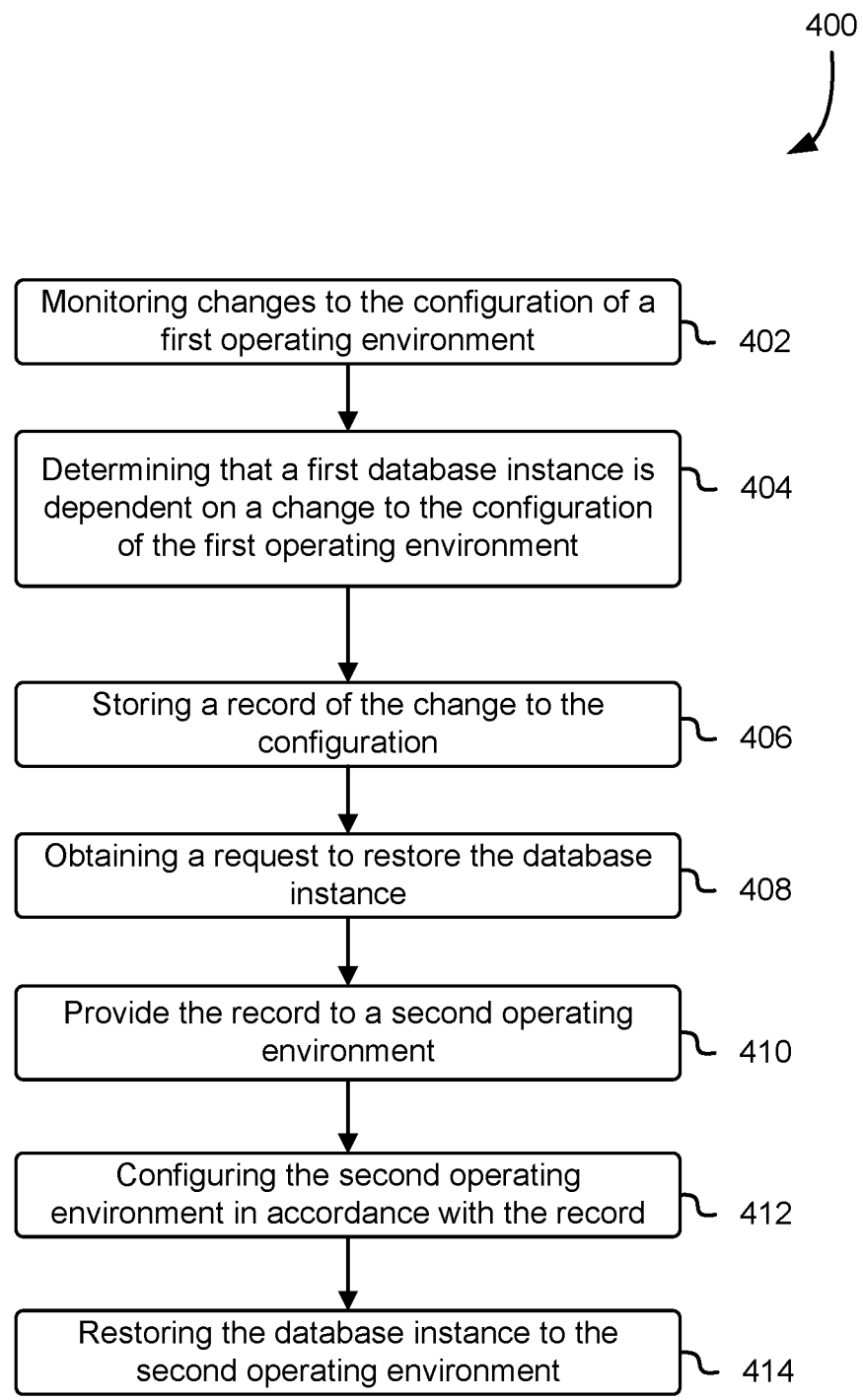
FIG. 4 is a flow diagram illustrating an example process for synchronizing configuration between operating environments, in accordance with an embodiment.

FIG. 4 is a flow diagram illustrating an example process for synchronizing configuration between operating environments, in accordance with an embodiment. Although FIG. 4 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 400 may be implemented by a distributed system. In an embodiment, a control plane performs one or more of the depicted operations. Examples of a control plane that may implement the depicted operations are provided at least in FIGS. 1 and 7.

At 402, the distributed system monitors changes to the configuration of a first operating environment. The control plane of an operating environment, in embodiments, may receive or otherwise obtain requests to perform configuration changes to the operating environment. The control plane can monitor configuration changes by examining these requests.

Configuration changes for the first operating environment can also be routed through the control plane, even though they might be handled elsewhere. For example, a request to perform a command to add a table to a database instance might be sent to the control plane. The control plane can then forward the request to the database instance.

At 404, the distributed system determines that a first database instance is dependent on a change to the configuration of the first operating environment. If performed, this operation pertains to determining whether or not a record of a configuration change should be stored, or to determining whether or not the configuration change should be applied to an operating environment in which a database instance is to be restored.

In an embodiment, the determination to store a record of the configuration change is based at least partly on metadata that comprises information indicative of configuration settings on which the first databases depends.

At 406, the distributed system stores a record of the change to the configuration. In general, the distributed system stores information sufficient to allow the configuration change to be subsequently reapplied in a new operating environment. The information may further comprise and indication of the time at which the configuration change was made, or the order in which it was made. A timestamp or other value may be used.

In some cases and embodiments, storing a record of the monitored change comprises generating an image of a virtual machine. The image can, for example, be stored in response to a change to the operating environment, in order to capture and subsequently reapply the configuration settings reflected in the image.

In some cases and embodiments, storing a record comprises storing a snapshot of a database instance. The snapshot of a database may be viewed as comprising transaction data, but may also be viewed as comprising configuration data. For example, the schema of a database might be treated as configuration data. Doing so has the technical effect of improving compatibility, since the snapshot can be used to recreate whatever schema existed as of the indicated point-in-time of the restoration. Note that subsequent transactions on the database might also alter the schema, but if so the schema is still current as of the indicated point-in-time, since transactions up to that point, but not afterwards, can be replayed.

At 408, the distributed system obtains a request to restore the database instance. For example, a control plane of the distributed system may, for example, receive a request from an administrative application to perform the restoration. Alternatively, an automated process may determine that a restoration is warranted and send a restoration request to a control plane.

A request to perform a point-in-time restoration may include a time value, or other indicator, to indicate the point-in-time to which the database should be restored. With respect to configuration settings, in various embodiments the restoration process includes steps or operations to apply configuration changes made to the source environment, up to the indicated point in time. Changes made to the configuration after the indicated point-in-time may be skipped. This has the technical effect of improving compatibility between the database and its operating environment.

At 410, the distributed system provides the record of the configuration change to a second operating environment. In some embodiments, this comprises replicating the configuration data to a geographic region proximate to the second operating environment. In other embodiments, this comprising assigning access rights to a user account associated with the second operating environment.

At 412, the distributed system configures the second operating environment in accordance with the record of the configuration change. In some cases, the distributed system configures the second operating also in accordance with a requested point-in-time for the restoration, so that configuration changes up to the indicated point-in-time are applied to the second operating environment.

In an embodiment, configuring the second operating environment in accordance with the record of the monitored change comprises adapting the configuration change to conform to the second operating environment. In one example, configuration settings applicable to the original operating environment are not applicable to the new operating environment, and the adaptation corresponds to transforming the configuration change to a null operation. In another example, configuration settings appropriate to a device found in the original environment are mapped to settings that are more appropriate, but still compatible, with a corresponding device found in the new operating environment.

In an embodiment, a control plane of the distributed system configures the second operating environment by sending instructions to restore an image of a virtual machine to an application server in the second operating environment, and to cause the restored virtual machine to execute.

In an embodiment, a control plane of the distributed system configures the second operating environment by sending instructions to perform a configuration command to application servers in the second operating environment. These commands may, for example, correspond to commands or other configuration changes reflected in a log of configuration changes.

In some cases and embodiments, configuration changes are applied to the second operating environment after a database instance has been restored to it. For example, there might be various configuration settings, such as those related to time zone or database name, which are adjusted subsequent to the restoration. These changes may be automated via a control plane in the second operating environment.

In some instances, the second operating environment may operate in a standby mode, even if no standby database instance has been instantiated within it. In such cases, configuration changes can be replicated to the second operating environment on an ongoing basis. For example, the control planes in the respective operating environments might cause changes to configuration made in the first operating environment to be applied within a threshold amount of time, to the second operating environment.

At 414, the distributed system restores the database instance to the second operating environment. An example of restoring the database instance is illustrated by FIG. 7.

Figure 5:
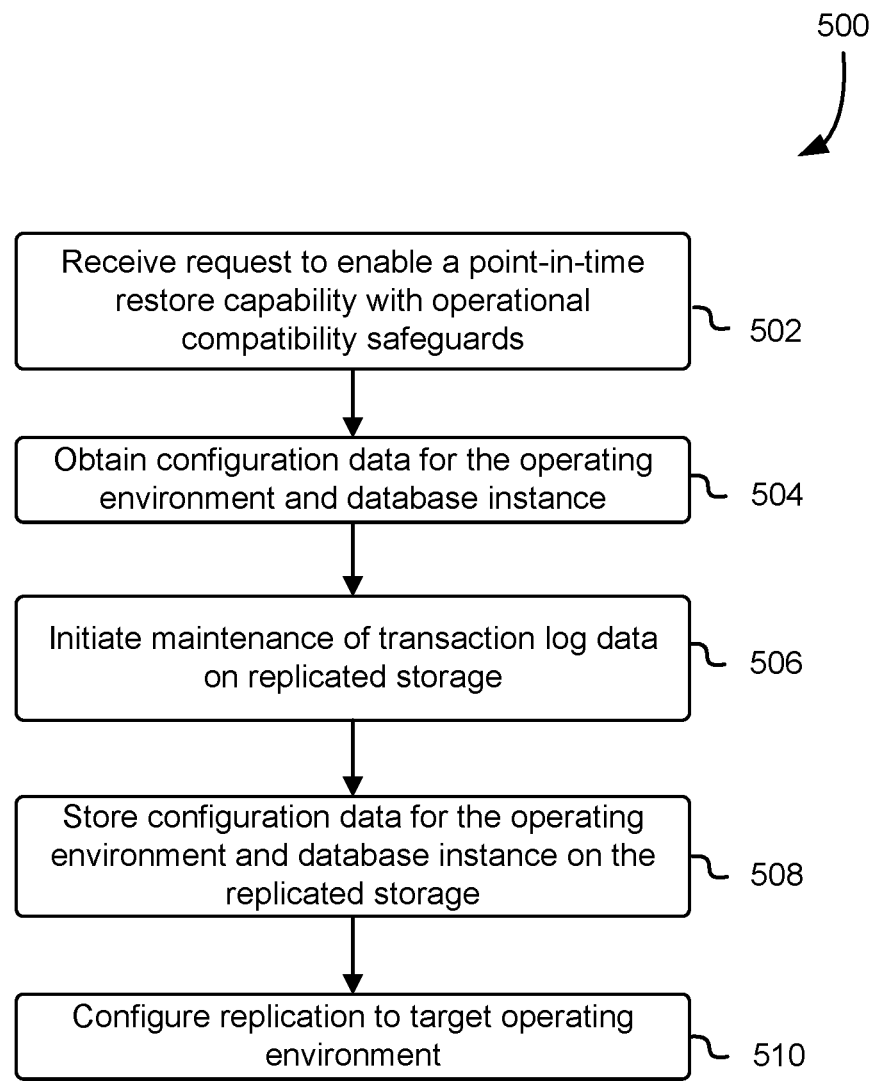
FIG. 5 is a flow diagram illustrating an example process for enabling a point-in-time database restoration capability, with delayed instantiating of the backup instance, in accordance with an embodiment.

FIG. 5 is a flow diagram illustrating an example process for enabling a point-in-time database restoration capability, with delayed instantiating of the backup instance, in accordance with an embodiment. Although FIG. 5 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 500 may be performed by a distributed system, such as the data distributed system 100 depicted in FIG. 1. In some embodiments, the depicted steps are performed or initiated by a control plane of the distributed system 100, such as the control plane 106a depicted in FIG. 1.

At 502, the control plane receives or otherwise obtains a request to enable a point-in-time restoration capability for a database instance, where the restoration capability is protected by operational continuity safeguards.

In embodiments, the restoration capability is provided with no backup instance being created, unless and until such an instance is requested. A backup instance refers to a node or instance of the database, such as a read replica of a database that processes the same transactions as the database instance, or a subset thereof. Instantiating the backup instance refers to executing the instance. As a consequence of not immediately instantiating the backup instance, the technical and monetary costs associated with executing such an instance is not incurred until and if such an instance is needed.

The operational continuity safeguards are associated with two accounts. A first account, which may be referred to as a primary account, is associated with the operation of the database instance for which the restoration capability is being enabled. A second account, which may be referred to as a secondary account, is used to act as a joint owner of account, configuration, and/or transaction data produced by the database instance. The secondary account is not necessarily limited to this role, however.

At 504, the control plane obtains configuration data for the operating environment and database instance. The operating environment refers to the operating environment in which the database instance is executing, or alternatively the operating environment in which the primary database instance will execute, in cases where restoration capability is requested when the database instance is initially configured. The configuration data is stored with information indicating that it is jointly owned by both the primary and secondary accounts, and as such is protected from deletion except where the distributed system obtains authorization from both of the primary and secondary accounts.

In an embodiment, the control plane obtains configuration data by recording snapshots of the database instance and of the computing device and/or virtual machine on which the database instance executes.

In an embodiment, the control plane obtains configuration data by monitoring changes made to the operating environment. For example, configuration changes to the operating environment may be routed through the control plane. The control plane can then store records of the configuration changes. In some instances, the control plane may initiate or facilitate configuration changes, and can record them.

In an embodiment, the control plane maintains metadata indicative of configuration aspects on which the database is dependent. For example, the control plane may store metadata indicative of configuration changes that have been made by or routed through the control plane. The metadata may further indicate which of these changes are pertinent to the operation of the database, and on which the database may therefore be considered dependent. The metadata might also provide means of identifying relevant configuration changes to an operating system or database configuration.

In an embodiment, the distributed system marks as jointly owned the aspects of configuration that are indicated by the metadata as being related to the operation of the database. In this manner, aspects of the configuration which may be relevant to the database instance are preserved for subsequent application to an operating environment in which a restored database can operate.

At 506, the control plane initiates maintenance of transaction log data on replicated storage. In this step, initiating maintenance refers to an ongoing basis to copy transaction data to a replicated storage location, such as a storage service accessible to the operating environment in which the original database instance is executing. The distributed system stores the transaction data with information indicating that it is jointly owned by both the primary and secondary accounts, and as such is protected from deletion except where the distributed system obtains authorization from both of the primary and secondary accounts.

In an embodiment, the control plane initiates maintenance of the transaction data by launching a thread or executable process which copies transaction data to a replicated storage location, such as a storage service with replication features. In an embodiment, the control plane monitors the transaction log for new entries, and copies the new transaction data to replicated storage. The data can be marked as jointly owned by the primary and secondary accounts.

In another embodiment, the control plane monitors a directory or other storage location for new transaction log files, and copies the new files to replicated storage. Alternatively, the thread or process may periodically copy a transaction log, or a portion thereof, to replicated storage. The transaction data, however stored, may protected by the distributed system from deletion except where authorization can be obtained from both of the primary and secondary accounts.

The replicated storage refers to a storage service that has replication features, including the ability to generate and store a copy of the files or other data stored on the service. For example, storage service with replication features may automatically store copies of data in at least two geographic regions. The transaction data copied to the replicated storage is therefore replicated in accordance with the replication features of the service. Alternatively, the replicated storage refers to a storage system or storage device that is replicated to another operating environment by the operating of control planes in the respective environments.

At 508, the control plane stores the configuration data for the operating environment and database instance on the replicated storage. This information may then be replicated to another location for use in a restoration of the primary database instance. This information may be replicated so that any information that indicates it should not be deleted without mutual authorization is preserved when it is replicated. Alternatively, it make be replicated to a location in which it is protected from deletion without mutual authentication.

At 510, the control plane configures replication to the target operating environment. When a client requests that a restoration capability be enabled, they may also specify one or more target operating environments. A target environment refers to an environment in which the database might be restored. For example, if the primary database instance operates in an operating environment geographically located on the West Coast, a target environment for restoring the database might be specified as the East Coast. This step may be optional, in the sense that the storage service may have replication features do not require such configuration. Also note that the replication may not always be to the target operating environment, but rather to a location that is accessible to the target operating environment.

Embodiments may configure the features of replication in accordance with requested attributes of the restoration. An example of such an attribute is latency of replication, since the ability to restore a database instance may depend on how long the data takes to replicate to the operating environment in which the database is to be restored. In some cases, replicating the data to the target environment helps to minimize the time needed to restore the database, since the transaction log and configuration data will have been transferred to the target operating environment prior to the restoration request.

Another aspect of replication involves ownership of the replicated data. Ownership refers to the account, or accounts, that can read or modify the replicated data. In an embodiment, the replication is configured to associate the replicated data with the same account used in conjunction with the primary database instance in the original operating environment. In another aspect, the replicated data is associated with another account that is used only in a target environment. In another aspect, the replicated data cannot be modified or deleted (but may be accessed) without approval from both accounts. In the absence of approval, the system prevents the replicated data from being modified or deleted.

Figure 6:
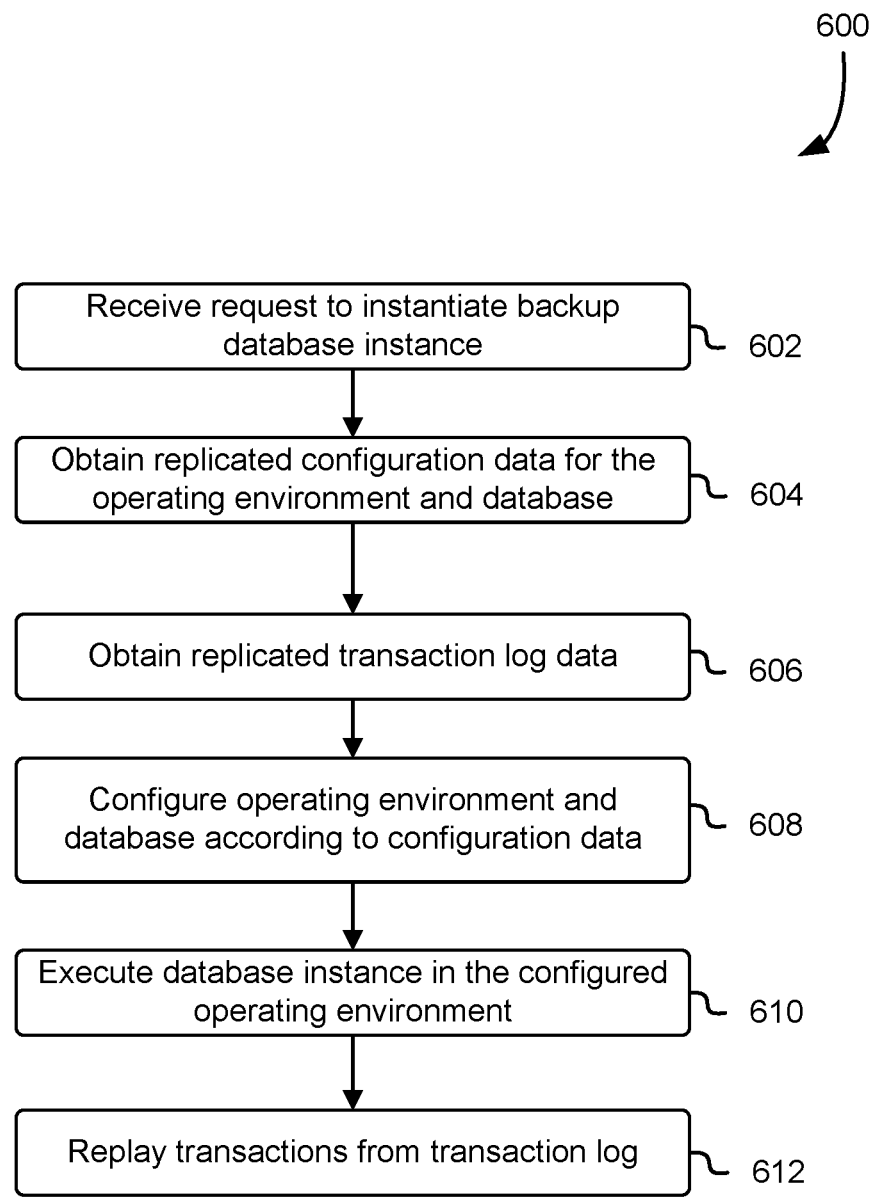
FIG. 6 is a flow diagram illustrating an example process for performing a point-in-time database restoration, in accordance with an embodiment.

FIG. 6 is a flow diagram illustrating an example process for performing a point-in-time database restoration, in accordance with an embodiment. Although FIG. 6 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), the at least some of the depicted steps may be reordered or performed in parallel.

The example process 600 may be performed by a distributed system, such as the distributed system 100 depicted in FIG. 1. In some embodiments, the depicted steps are performed or initiated by a control plane of the distributed system 100, such as the control plane 106a depicted in FIG. 1.

At 602, the distributed system receives a request to instantiate a backup database instance. As noted, the instantiation of the backup database instance occurs when the restoration is requested, rather than when the client requests that the restoration capability be enabled. A control plane in an active operating environment may receive the request. If not in the target operating environment, the control plane that received the request may then forward it to the control plane in the target operating environment.

In an embodiment, metering the capacity utilized for executing the restored instance is initiated in response to receiving the request to instantiate the backup instance, e.g., once the backup instance has become operable. Prior to the request, no such costs are associated with the backup instance. There may, however, be costs associated with monitoring, storing, and replicating transaction log and configuration data. The metering may be initiated by the control plane after receiving the request and completing the instantiation of the restored instance. The control plane may, for example, begin collecting data pertaining to how much data is read from or written to the restored database instance, and store records associating those activities with a corresponding account.

In an embodiment, the distributed system configures the operating environment and database by accessing configuration and replication data based on the credentials of the secondary account. For example, the control plane may verify that the request to perform the restoration was obtained from interactions with a user interface or invocations of application programming interface in which the credentials of the secondary account were provided. In embodiments, the control plane may verify that files, records, or other data accessed during the restoration process is associated with the secondary account. In some embodiments, security features of the operating system may be leveraged to indicate and confirm that the secondary account is an owner of the data accessed during the restoration, and to prevent accounts other than the primary and secondary accounts from accessing the data.

At 604, the distributed system obtains the replicated configuration data for the operating environment and database. The information is accessed based on authorization associated with the second account. In an embodiment, a control plane operating in a second operating environment obtains configuration data for a first operating environment. In an embodiment, the control plane identifies data relevant to the database instance (for example, based on account information, a database instance identifier, an operating environment identifier, and so forth) and retrieves the corresponding configuration information from a storage device or service accessible in the second operating environment. The information may be included in the received request to restore the database instance. Once identified based on this information, the data can be retrieved from a storage location accessible to the second operating environment.

At 606, the distributed system obtains the replicated transaction log data. The data is accessed based on authorization associated with the second account. In an embodiment, the control plane in the target operating environment retrieves the transaction data from a storage service. On the storage service, the transaction data is identified based on a naming pattern or identification system that incorporates information such as account number, database instance identifier, operating environment identifier, and so forth. The information that identifies the transaction data that may be included in the request to restore the database instance. The data may be stored on the storage service with information indicating that it can be accessed based on the secondary account.

At 608, the distributed system configures the operating environment and database according the obtained configuration data. In an embodiment, this is done via a control plane in the second operating environment. For example, the configuration information may be structured as a collection of configuration logs and snapshots. The configuration logs may describe a series of changes made to the first operating environment. The logs may include information indicating when the configuration changes were made. The snapshot information can include database snapshots, virtual machine snapshots, and so forth, and may be associated with information indicating when the snapshots were taken. Using the time information, the control plane may apply relevant configuration changes up to the desired time for the point-in-time restoration. Similarly, snapshots current as of the indicated restoration time may also be used. In this manner, the configuration of the first operating environment can be recreated in the second operating environment, to the extent necessary to allow the restored database to run in the second environment.

At 610, the distributed system executes the new database instance in the target operating environment. This may be done via inter-process communication between the control plane in the target environment and the operating system of the computing device or virtual machine on which the database instance is to be executed on.

At 612, the distributed system replays the transaction from the transaction log. Replaying the transaction log refers to causing the new database instance to process the transactions represented by entries in the transaction log. In an embodiment, the control plane initiates the replaying by sending a command to the new database instance. The command indicates that the database instance should replay entries in a transaction log, and provides a location where the database instance can access the log.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server(s) 708, a control plane 709, and a data store 710. It should be understood that there can be several application servers, control planes, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server(s) 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

In an embodiment, the control plane 709 performs operations to coordinate the activities and operation of components within the system 700. The control plane may comprise a computing device with at least one processor, one or more non-transitory memories, and instructions that, in response to being executed, perform operations of a control plane as described herein. The control plane 709 may further comprise one or more network interfaces for communicating with the web server 706, application server(s) 708, and data store 710.

The control plane 709, in various embodiments, is configured to have access to information not accessible to the web server 706 and/or application server(s) 708. This information may include aspects of user information 716, such as credentials, certificates, account and billing information, system configuration data, and so forth.

The control plane 709, in various embodiments, manages the allocation and configuration of the application server(s) 708 and virtual machines 711. The virtual machines 711 operate on the application server(s) 708. In various embodiments, when a computing resource, such as a database instance, is requested within an operating environment, the control plane 709 identifies an application server(s) 708 with sufficient available capacity and assigns it to execute a virtual machine. The control plane 709 then configures the virtual machine, including performing steps to ensure that software (such as software for a database instance) is installed.

In various embodiments, the control plane 709 can perform operations to configure communications networks. For example, the control plane 709 can configure communications between the web server 706 and application server(s) 708. The control plane 709 may also configure routers, gateways, and other devices in order to provide and secure communications between the web server 706, application server(s) 708, and client device 702.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing data 712 and user information 716, which are used to serve content. The data store also is shown to include a mechanism for storing operations data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server(s) 708 and obtain, update or otherwise process data in response thereto and the application server(s) 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network. These non-virtual devices operate on physical computing devices, such as the depicted application servers.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C# or C++, or any scripting language, such as Ruby, PHP, Perl, Python or TCL, as well as combinations thereof. In an embodiment, the one or more servers also include database servers, including without limitation those commercially available from Oracle*, Microsoft*, Sybase*, and IBM© as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   a memory that stores computer-executable instructions that, in response to being executed by the at least one processor, cause the system to:

in response to a request to enable a point-in-time restore capability for a first database instance operative in a first operating environment, monitor, by a first control plane, changes to a configuration of the first operating environment;

determine that the first database instance is dependent on a monitored change to the configuration of the first operating environment, the monitored change in effect as of a requested point-in-time of a requested point-in-time restoration, wherein the monitored change indicates a configuration setting to be applied to an operating environment in which the first database instance is to be restored;

store a record of the monitored change, the record comprising information indicative of a time at which the configuration change was made;

determine to store the record of the monitored change to the configuration based at least in part on metadata comprising information indicative of dependencies of the first database instance;

store a log of one or more changes made to the configuration of the first operating environment, wherein the log comprises an indication of whether or not the change to the configuration was successful;

replicate the record to a second operating environment, the second operating environment comprising a second control plane that, in response to a request to restore the first database to the second operating environment, configures the second operating environment based at least in part on the record of the monitored change to conform to the configuration of the first operating environment as of the requested point-in-time indicated by the request and the determination that the first database instance is dependent on the monitored change; and restore the first database instance to the second operating environment.

2. The system of claim 1, wherein changes to the configuration of the first operating environment are routed through the first control plane.

3. The system of claim 1, wherein storing a record of the monitored change comprises generating an image of a virtual machine.

4. The system of claim 1, wherein configuring the second operating environment in accordance with the record of the monitored change comprises adapting the configuration change to conform to capabilities of a virtual machine in the second operating environment.

5. The system of claim 1, wherein the second control plane changes configuration of the second operating environment within a threshold amount of time from when the change is made to the first operating environment.

6. A computer-implemented method, comprising:

in response to a request to enable a point-in-time restore capability for a first database instance operative in a first operating environment, monitoring, by a first control plane, changes to a configuration of the first operating environment in which the first database instance is operative;

determining that the first database instance is dependent on a change to the configuration of the first operating environment, the change in effect as of a requested point-in-time of a requested point-in-time restoration, wherein the change indicates a configuration setting that is to be applied to an operating environment in which the first database instance is to be restored;

storing a record of the change to the configuration, the record comprising information indicative of a time at which the configuration change was made;

determining to store the record of the change to the configuration based at least in part on metadata comprising information indicative of dependencies of the first database;

storing a log of one or more changes made to the configuration of the first operating environment, wherein the log comprises an indication of whether or not the change to the configuration was successful;

providing the record to a second operating environment;

replicating the record to a second operating environment, wherein the second operating environment comprising a second control plane that configures a second operating environment based at least in part on the record of the change to the configuration and the requested point-in-time for restoration of the first database instance; and restoring the first database instance to the second operating environment.

7. The method of claim 6, further comprising routing requests to perform configuration changes to the first operating environment through the first control plane.

8. The method of claim 6, wherein configuring the second operating environment in accordance with the record of the change comprises adapting the configuration change to conform to the second operating environment.

9. The method of claim 6, wherein the second control plane changes configuration of the second operating environment within a threshold amount of time from when the change is made to the first operating environment.

10. The method of claim 6, further comprising storing a snapshot of the first database instance.

11. The method of claim 6, further comprising storing an image of a virtual machine of the first operating environment.

12. The method of claim 11, wherein the image is stored in response to a change to the first operating environment.

13. The method of claim 6, wherein, when the second operating environment is in standby mode, the second control plane causes configuration changes to be applied to the second operating environment on an ongoing basis.

14. A non-transitory computer-readable storage medium comprising executable instructions that, as a result of being executed by one or more processors of a computer system, cause the computer system to at least:

in response to a request to enable a point-in-time restore capability for a first database instance operative in a first operating environment, monitor, by a first control plane, changes to a configuration of the first operating environment in which the first database instance is operative;

determine that the first database instance is dependent on a change to the configuration, the change made prior to a requested point-in-time of a requested point-in-time restoration, of the first operating environment, wherein the change indicates a configuration setting that is to be applied to an operating environment in which the first database is to be restored and operative;

store a record of the change to the configuration, the record comprising information indicative of a time at which the configuration change was made;

determine to store the record of the change to the configuration based at least in part on metadata comprising information indicative of dependencies of the first database instance;

store a log of one or more changes made to the configuration of the first operating environment, wherein the log comprises an indication of whether or not the change to the configuration was successful;

provide the record to a second operating environment; and replicate the record to a second operating environment, the second operating environment comprising a second control plane that configures the second operating environment to apply the record of the change to the configuration of the first operating environment to conform the second operating environment to the first operating environment in accordance with the requested point-in-time of the requested point-in-time restoration of the first database instance.

15. The non-transitory computer-readable storage medium of claim 14, comprising further instructions that, as a result of being executed by the one or more processors, cause the computer system to adapt the configuration change to conform to the second operating environment.

16. The non-transitory computer-readable storage medium of claim 14, comprising further instructions that, as a result of being executed by the one or more processors, cause the computer system to send instructions to change a configuration of the second operating environment within a threshold amount of time from when the change is made to the first operating environment.

17. The non-transitory computer-readable storage medium of claim 14, comprising further instructions that, as a result of being executed by the one or more processors, cause the computer system to store an image of a virtual machine of the first operating environment in response to a configuration change of the first operating environment.

18. The non-transitory computer-readable storage medium of claim 17, comprising further instructions that, as a result of being executed by the one or more processors, cause the computer system to send instructions to restore the image to a virtual machine of the second operating environment.

19. The non-transitory computer-readable storage medium of claim 14, comprising further instructions that, as a result of being executed by the one or more processors, cause the computer system to store a snapshot of the first database instance.

20. The non-transitory computer-readable storage medium of claim 14, comprising further instructions that, as a result of being executed by the one or more processors, cause the computer system to restore the first database instance to the second operating environment.

* * * * *